Patented July 10, 1951

2,559,751

UNITED STATES PATENT OFFICE 2,559,751

FLUOROALKYLSULFURIC COMPOUNDS

Kenneth Lester Berry, Hockessin, and James Arthur Bittles, Jr., Wilmington, Del., assignors to E. I. du Pont de Nemours & Company, Wilmington, Del., a corporation of Delaware No Drawing. Application June 29, 1950,
Serial No. 171,242

11 Claims. (Cl. 260—458)

This invention relates to a new class of fluorinated organic compounds and, more particularly, to certain fluoroalkylsulfuric acids and salts thereof.

Little is known of the fluoroalkylsulfuric acids, i. e., the acid sulfates of fluoroalkanols. In particular, there is no description in the chemical literature of the fluoroalkylsulfuric acids having a multiplicity of difluoromethylene, —$CF_2$—, groups.

An object of the present invention is to provide a new class of fluorinated organic compounds of technological interest. A further object is to provide a class of fluoroalkylsulfuric acids and salts thereof characterized by their stability, non-flammability, and value in various technological uses. A more particular object is to provide such a class of compounds which are excellent dispersing agents. Other objects will be apparent from the description of the invention given hereinafter.

The above objects are accomplished according to the present invention by providing a class of fluoroalkylsulfuric acids having the formula $B(CF_2)_nCH_2OSO_3H$ wherein B is hydrogen or fluorine and $n$ is an integer at least equal to 4, and salts thereof. More specifically, the invention comprises those acids wherein $n$ in the above formula is an integer from 4 to 20, inclusive, and the salts thereof. Because of their unique value as dispersing agents, the preferred compounds are those having the formula $$B(CF_2)_nCH_2OSO_3M$$

wherein B is hydrogen or fluorine, $n$ is an integer from 5 to 12, inclusive, and M is an alkali metal ion or the ammonium radical.

The starting materials for the preparation of the fluoroalkylsulfuric acids of this invention are the corresponding fluoroalkanols of the formula $B(CF_2)_nCH_2OH$, wherein B is hydrogen or fluorine and $n$ is an integer at least equal to 4. Of these alcohols, those having the formula $$H(CF_2)_nCH_2OH$$

wherein $n$ is an even integer, can be prepared by reacting tetrafluoroethylene with methanol at a temperature of 50° C. to 350° C. in the presence of a peroxy catalyst, as described in U. S. application Serial No. 65,063, filed in the name of R. M. Joyce on December 13, 1948. There is obtained a mixture of fluoroalkanols of the above formula wherein $n$ varies from 2 to 24 or more. These mixtures can be separated into individual fractions by appropriate methods such as distillation, steam distillation, crystallization and the like, or the mixtures may be used as such in the preparation of the sulfates. Fluoroalkanols having the formula $F(CF_2)_nCH_2OH$ may be prepared by reduction, for example with lithium aluminum hydride in anhydrous ether, of the corresponding fluorocarboxylic acids $F(CF_2)_nCOOH$, which have recently been described, or by catalytic hydrogenatoin of their esters. These fluorocarboxylic acids are made by electrolysis of the corresponding alkanoic acids or anhydrides in hydrogen fluoride, thus forming the fluorinated acid fluoride, which is subsequently hydrolyzed to the acid.

The fluoroalkylsulfuric acids are prepared by reacting the appropriate fluoroalkanol with concentrated sulfuric acid, preferably containing sulfuric anhydride, or with chlorosulfonic acid. The reaction is often exothermic and can be carried out at low or moderate temperature, e. g., within the range from —20° C. to 50° C., but, if desired, higher temperatures, e. g., up to 150° C. can be used. A solvent is not necessary, particularly if an excess of sulfonating agent is used, but, if desired, any suitable inert solvent can be used such as saturated aliphatic or alicyclic hydrocarbons, e. g, hexane, decane, kerosene, cyclohexane, or halogenated hydrocarbons such as carbon tetrachloride, or other solvents such as carbon disulfide.

The free fluoroalkylsulfuric acids may be separated from the reaction mixture through their barium salts, from which they can be isolated by treatment with the calculated quantity of sulfuric acid. They are sirupy, hygroscopic liquids soluble in water and strongly acidic. Preferably, the fluoroalkylsulfuric acids are isolated as their salts, of which the most useful are the alkali metal (e. g., potassium, sodium, lithium) salts and the ammonium salts. Other useful salts include the alkaline earth metal (e. g., calcium and barium salts) the heavy metal (e. g., zinc, mercury, lead) salts and the substituted ammonium salts, i. e., the amine salts, particularly with alkylamines of one to six carbon atoms such as methylamine, ethylamine, diethylamine, butylamine, hexylamine, etc., and the salts with the tetraalkyl ammonium bases corresponding to these amines.

The invention is illustrated in greater detail by the following examples, in which all parts are by weight unless otherwise stated.

EXAMPLE I

Two-tenths mole (66.5 parts) of dodecafluoroheptanol ($H(CF_2)_6CH_2OH$, B. P. 170°–171° C.)

was dropped slowly into sulfuric acid containing 65% sulfur trioxide, with constant stirring and intermittent cooling to keep the temperature below 30–40° C. After the addition was completed, the liquid reaction mixture was poured onto cracked ice and the resulting aqueous solution was neutralized with potassium hydroxide, keeping the temperature below 25° C. The potassium fluoroalkyl sulfate crystallized from the solution. It was filtered and recrystallized from water. There was obtained 73.5 parts (82% yield) of potassium dodecafluoroheptyl sulfate, $$H(CF_2)_6CH_2OSO_3K$$

*Analysis.*—Calculated for $C_7H_3F_{12}O_4SK$: S, 7.11; K, 8.67. Found: S, 7.12; K, 8.8.

EXAMPLE II

One-tenth mole (43.2 parts) of hexadecafluorononanol ($H(CF_2)_8CH_2OH$, B. P. 156°–158° C. at 194 mm. pressure) was added gradually to 0.1 mole (11.6 parts) of chlorosulfonic acid. After the evolution of hydrogen chloride had ceased, the mixture was dissolved in 120 parts of carbon tetrachloride and anhydrous ammonia was passed into the solution until precipitation was complete. The solid material was taken up with 175 parts of absolute ethanol and the ethanol solution was filtered to remove some insoluble material. Evaporation of the filtrate gave 30.5 parts (56% yield) of ammonium hexadecafluorononyl sulfate, $H(CF_2)_8CH_2OSO_3NH_4$.

*Analysis.*—Calculated for $C_9H_7O_4SNF_{16}$: S, 6.07; N, 2.64. Found: S, 5.87; N, 3.37.

As indicated before, the ammonium and alkali metal fluoroalkyl sulfates having from 6 to 13 carbon atoms, inclusive, (i. e., those wherein $n$ is an integer from 5 to 12 in the formula) are excellent dispersing agents. In particular, they can be used with good results in the preparation of aqueous polymer dispersions by direct polymerization of ethylenic monomers in aqueous systems. This property of the fluoroalkyl sulfates is illustrated by the following:

A. *Polymerization of ethylene*

A stainless steel vessel having a volume capacity of 1600 parts of water was charged with a solution of 2 parts of ammonium persulfate, 2 parts of sodium bisulfite, 0.025 part of ferrous ammonium sulfate, 4 parts of disodium hydrogen phosphate and 4 parts of ammonium hexadecafluorononyl sulfate in 200 parts of deoxygenated water. The vessel was flushed with nitrogen, evacuated and charged with 150 parts of deoxygenated ethylene. After agitating at 30° C. for 20 hours, an aqueous dispersion of ethylene polymer resulted. The dispersion was acidified and the polymer was collected by filtration. After washing with water and drying, there was obtained a white powder having an inherent viscosity of 0.83 and a bending modulus of 61,000 lb./sq. in.;

B. *Polymerization of tetrafluoroethylene*

A mixture of 0.5 part of potassium dodecafluoroheptyl sulfate, 0.05 part of potassium persulfate, 5 parts of paraffin and sufficient water to make up 100 parts, was heated to 69–70° C. and deaerated by short boiling under reduced pressure. The mixture was maintained under 54–56 lbs./sq. in. tetrafluoroethylene pressure and agitated 6 hours at 69–70° C. There was obtained an aqueous colloidal dispersion of polytetrafluoroethylene containing 20.7% solids.

Under substantially the same conditions, but using ammonium hexadecafluorononyl sulfate as the dispersing agent, there was obtained a polytetrafluoroethylene dispersion containing 32.5% solids.

In connection with the above, it may be noted that it is not possible to polymerize tetrafluoroethylene directly to an aqueous polymer dispersion when the conventional dispersing agents are used, since they apparently interrupt the growing polymer chains, thus stopping the polymerization at a very early stage.

It will be understood the foregoing examples are merely illustrative and that the present invention broadly comprises fluoroalkylsulfuric acid having the formula $B(CF_2)_nCH_2OSO_3H$ wherein B is hydrogen or fluorine and $n$ is an integer at least equal to 4, and salts thereof.

In the manner disclosed above and illustrated in the examples by the preparation of two of the compounds of the present invention, the other compounds of the present invention may be readily prepared as those skilled in the art will appreciate. Such compounds include the following fluoroalkylsulfuric acids and their salts; octafluoroamylsulfuric acid, nonafluoroamylsulfuric acid, undecafluorohexylsulfuric acid, heptadecafluorononylsulfuric acid, nonadecafluorodecylsulfuric acid, eicosafluoroundecylsulfuric acid, tetracosafluorotridecylsulfuric acid, and tetracontafluoroheneicosylsulfuric acid. More specifically, this invention comprises the fluoroalkylsulfuric acids and salts having from 5 to 21 carbon atoms, inclusive, i. e., from 4 to 20 difluoromethylene, $-CF_2-$, groups. Because of their special utility as dispersing agents, the preferred compounds are the ammonium and alkali metal salts of fluoroalkylsulfuric acids of the above-defined structure which have from 6 to 13 carbon atoms, inclusive. Particularly preferred, because more readily accessible, are the ammonium and alkali metal salts of the fluoroalkylsulfuric acids of the formula $H(CF_2)_nCH_2OSO_3H$, wherein $n$ is an even integer from 6 to 12, inclusive.

In addition to their already mentioned use as dispersing agent, the fluoroalkylsulfuric acids and salts of this invention are useful as fluoroalkylating agents, detergents, flameproofing agents and additives to flameproofing compositions.

As many apparently widely different embodiments of this invention may be made without departing from the spirit and scope thereof, it is to be understood that the invention is not limited to the specific embodiments thereof except as defined in the appended claims.

The invention claimed is:

1. A fluoroalkylsulfuric compound from the group consisting of fluoroalkylsulfuric acids having the formula $B(CF_2)_nCH_2OSO_3H$ wherein B is from the group consisting of hydrogen and fluorine and $n$ is an integer at least equal to 4, and salts thereof.

2. A fluoroalkylsulfuric compound having the formula $H(CF_2)_nCH_2OSO_3M$ wherein $n$ is an integer from 4 to 20, inclusive, and M is an alkali metal ion.

3. A fluoroalkylsulfuric compound having the formula as set forth in claim 2 wherein $n$ is an integer from 5 to 12, inclusive.

4. A fluoroalkylsulfuric compound having the formula $F(CF_2)_nCH_2OSO_3M$ wherein $n$ is an integer from 4 to 20, inclusive, and M is an alkali metal ion.

5. A fluoroalkylsulfuric compound having the formula as set forth in claim 4 wherein $n$ is an integer from 5 to 12, inclusive.

6. A fluoroalkylsulfuric compound having the formula $H(CF_2)_nCH_2OSO_3NH_4$ wherein $n$ is an integer from 4 to 20, inclusive.

7. A fluoroalkylsulfuric compound having the formula as set forth in claim 6 wherein $n$ is an integer from 5 to 12, inclusive.

8. A fluoroalkylsulfuric compound having the formula $F(CF_2)_nCH_2OSO_3NH_4$ wherein $n$ is an integer from 4 to 20, inclusive.

9. A fluoroalkylsulfuric compound having the formula as set forth in claim 8 wherein $n$ is an integer from 5 to 12, inclusive.

10. Potassium dodecafluoroheptyl sulfate.

11. Ammonium hexadecafluorononyl sulfate.

KENNETH LESTER BERRY.
JAMES ARTHUR BITTLES, JR.

REFERENCES CITED

The following references are of record in the file of this patent:

UNITED STATES PATENTS

| Number | Name | Date |
|---|---|---|
| 2,411,159 | Hanford | Nov. 19, 1946 |

Certificate of Correction

Patent No. 2,559,751            July 10, 1951

KENNETH LESTER BERRY ET AL.

It is hereby certified that error appears in the printed specification of the above numbered patent requiring correction as follows:

Column 1, line 45, for "$H(CR_2)$" read $H(CF_2)$; column 2, line 9, for "hydrogenatoin" read *hydrogenation*; column 4, line 16, for "acid" read *acids*;

and that the said Letters Patent should be read as corrected above, so that the same may conform to the record of the case in the Patent Office.

Signed and sealed this 4th day of September, A. D. 1951.

[SEAL]

THOMAS F. MURPHY,
*Assistant Commissioner of Patents.*